(12) United States Patent
Oren et al.

(10) Patent No.: US 10,598,015 B2
(45) Date of Patent: Mar. 24, 2020

(54) ANTI-ROTATION ASSEMBLY

(71) Applicant: UNITED TECHNOLOGIES CORPORATION, Farmington, CT (US)

(72) Inventors: Nicholas Waters Oren, Marlborough, CT (US); Ross Wilson, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 294 days.

(21) Appl. No.: 15/794,676

(22) Filed: Oct. 26, 2017

(65) Prior Publication Data
US 2019/0128119 A1 May 2, 2019

(51) Int. Cl.
*F16B 7/04* (2006.01)
*F01D 5/02* (2006.01)
(Continued)

(52) U.S. Cl.
CPC ........... *F01D 5/026* (2013.01); *F01D 25/162* (2013.01); *F02C 3/073* (2013.01); *F16B 7/04* (2013.01);
(Continued)

(58) Field of Classification Search
CPC ........ F01D 5/026; F01D 25/162; F02C 3/073; F05D 2220/32; F05D 2240/60; F05D 2250/182; F05D 2250/281; F05D 2250/311; F05D 2260/30; F05D 2260/31; F05D 2260/36; F16B 7/0406; F16B 7/0413; F16B 7/042; F16B 7/182; F16B 7/187; F16D 1/02; F16D 1/06; F16D 1/108; F16D 1/112; F16D 1/116; F16D 2001/102;
(Continued)

(56) References Cited

U.S. PATENT DOCUMENTS 1,263,252 A * 4/1918 Jencick ................... F16D 1/076
464/157
3,884,049 A * 5/1975 Pauli ...................... F16D 1/0847
464/73
(Continued)

FOREIGN PATENT DOCUMENTS

EP 1253336 10/2002
EP 2416027 2/2012
(Continued)

OTHER PUBLICATIONS

European Patent Office, European Search Report dated Feb. 4, 2019 in Application No. 18189060.9.

*Primary Examiner* — Josh Skroupa
(74) *Attorney, Agent, or Firm* — Snell & Wilmer L.L.P.

(57) ABSTRACT

An anti-rotation assembly may include a first shaft, a second shaft, and a locking sprocket. The first shaft may have a first crenelated end rim, the second shaft may have a second crenelated end rim, and the locking sprocket may be configured to engage the first crenelated end rim and the second crenelated end rim to anti-rotatably couple the first shaft to the second shaft. That is, the locking sprocket may be configured to prevent relative rotation between the two shafts. The anti-rotation assembly may further include an axial retaining ring configured to axially retain the locking sprocket.

19 Claims, 7 Drawing Sheets

(51) Int. Cl.
*F01D 25/16* (2006.01)
*F02C 3/073* (2006.01)
*F16B 39/282* (2006.01)

(52) U.S. Cl.
CPC ........ *F16B 39/282* (2013.01); *F05D 2220/32* (2013.01); *F05D 2240/60* (2013.01); *F05D 2250/182* (2013.01); *F05D 2260/30* (2013.01); *F05D 2260/31* (2013.01); *F05D 2260/36* (2013.01); *Y10T 403/559* (2015.01); *Y10T 403/5773* (2015.01)

(58) Field of Classification Search
CPC ........... F16D 2001/103; Y10S 464/901; Y10T 403/559; Y10T 403/57; Y10T 403/5773; Y10T 403/581; Y10T 403/587; Y10T 403/7031; Y10T 403/7033; Y10T 403/7035
USPC ............ 403/298, 300, 311, 316, 319, 359.3, 403/359.5, 359.6, DIG. 4; 464/147, 182, 464/901
See application file for complete search history.

(56) References Cited

U.S. PATENT DOCUMENTS

| | | | | |
|---|---|---|---|---|
| 4,512,596 A * | 4/1985 | Obrecht | ................ | E21B 17/043 285/81 |
| 5,474,334 A * | 12/1995 | Eppink | .................. | E21B 7/067 175/74 |
| 5,950,744 A * | 9/1999 | Hughes | .................. | E21B 17/046 166/242.6 |
| 6,009,609 A | 1/2000 | Hanno | | |
| 6,070,912 A * | 6/2000 | Latham | ................ | F16L 15/008 285/148.19 |
| 6,572,337 B1 * | 6/2003 | Herron | .................... | F01D 5/026 416/198 A |
| 6,860,525 B2 * | 3/2005 | Parks | .................... | F16L 37/105 285/371 |
| 8,485,798 B2 | 7/2013 | Sheth | | |
| 8,739,861 B2 * | 6/2014 | Hughes | .................. | E21B 17/028 166/65.1 |
| 8,739,901 B2 * | 6/2014 | Cote | ......................... | E21B 4/10 175/296 |
| 9,133,968 B2 * | 9/2015 | Elrick | ................... | E21B 17/046 |
| 9,347,322 B2 | 5/2016 | Gurao et al. | | |
| 9,574,600 B2 | 2/2017 | Lagarde et al. | | |
| 9,869,198 B2 * | 1/2018 | Wotzak | .................... | F01D 15/12 |
| 10,151,352 B2 * | 12/2018 | Creek | .................... | F16D 1/116 |
| 2007/0071545 A1 | 3/2007 | Schenk | | |
| 2015/0361901 A1 | 12/2015 | Anglin et al. | | |
| 2016/0010458 A1 * | 1/2016 | Virkler | .................... | F01D 5/026 416/120 |
| 2016/0333722 A1 | 11/2016 | Wotzak | | |

FOREIGN PATENT DOCUMENTS

| | | |
|---|---|---|
| GB | 675504 | 7/1952 |
| WO | 2014197074 | 12/2014 |

* cited by examiner

ANTI-ROTATION ASSEMBLY

GOVERNMENT LICENSE RIGHTS

This disclosure was made with government support under contract number FA8626-16-C-2139 awarded by the United States Air Force. The government has certain rights in the disclosure.

FIELD

The present disclosure relates to coupling assemblies, and more specifically, to anti-rotatably coupling two shafts together.

BACKGROUND

In various applications, it may be beneficial to couple two components together in such a manner so as to prevent relative rotation between said components. For example, in a gas turbine engine, threaded shafts and/or spools may be coupled together and may be configured to co-rotate while preventing relative rotation between the shafts. In conventional assemblies, thermal stresses, cyclic loading, and/or inertial moments, among other factors, may cause conventional coupling mechanisms to become compromised (e.g., fail or at least loosen). The compromised coupling mechanisms may allow the shafts/spools to rotate relative to each other, thus causing damage to the shafts/spools themselves and/or the surrounding components. While there are various conventional solutions for anti-rotatably coupling two shafts together, these conventional solutions are often bulky, heavy, and/or difficult to assemble.

SUMMARY

In various embodiments, the present disclosure provides an anti-rotation assembly that includes a first shaft, a second shaft, and a locking sprocket. The first shaft may have a first crenelated end rim, the second shaft may have a second crenelated end rim, and the locking sprocket may be configured to engage the first crenelated end rim and the second crenelated end rim to anti-rotatably couple the first shaft to the second shaft. That is, the locking sprocket may be configured to prevent relative rotation between the two shafts.

The anti-rotation assembly may further include an axial retaining ring configured to axially retain the locking sprocket. In various embodiments, the first crenelated end rim defines a plurality of first crenels, the second crenelated end rim defines a plurality of second crenels, and the locking sprocket includes a plurality of teeth that are configured to extend into the plurality of first crenels and the plurality of second crenels to prevent relative rotation between the first shaft and the second shaft.

In various embodiments, a body of the locking sprocket, from which the plurality of teeth extends, is disposed radially inward of the first crenelated end rim and the second crenelated end rim. In various embodiments, an inner radius of the body of the locking sprocket is the same as an inner radius of the first shaft and the second shaft. In various embodiments, the plurality of first crenels are defined between a plurality of first merlons of the first crenelated end rim, the plurality of second crenels are defined between a plurality of second merlons of the second crenelated end rim, the plurality of first merlons are aligned with the plurality of second merlons, and the plurality of first crenels are aligned with the plurality of second crenels.

In various embodiments, the plurality of first merlons collectively define a circumferential groove configured to receive the axial retaining ring. In various embodiments, the first crenelated end rim is axially longer than the second crenelated end rim. The circumferential groove may be disposed at an axial midpoint between first closed ends of the plurality of first crenels of the first crenelated end rim and second closed ends of the plurality of second crenels of the second crenelated end rim. In various embodiments, the first shaft includes first threads disposed on a first radially outward surface of the first shaft and the second shaft comprises second threads disposed on a second radially outward surface of the second shaft.

Also provided herein, according to various embodiments, is a gas turbine engine that includes a first shaft, a second shaft, and a locking sprocket. The first shaft may include a first crenelated end rim, the second shaft may include a second crenelated end rim, and the locking sprocket may be configured to engage the first crenelated end rim and the second crenelated end rim to anti-rotatably couple the first shaft to the second shaft. The first shaft may be a first stage turbine shaft and the second shaft may be a second stage turbine shaft. In various embodiments, the first shaft is a turbine shaft and the second shaft is a compressor shaft. The first shaft may be a tie bolt and the second shaft may be a tie shaft.

Also provided herein, according to various embodiments, is a method of assembling a gas turbine engine. The method may include engaging a locking sprocket on a first crenelated end rim of a first shaft, positioning a second shaft so that a second crenelated end rim of the second shaft is juxtaposed with the first crenelated end rim, and axially moving the locking sprocket to engage the first crenelated end rim and the second crenelated end rim. In various embodiments, engaging the locking sprocket on the first crenelated end rim of the first shaft includes engaging an axial retaining ring in a circumferential groove defined in the first crenelated end rim to axially retain the locking sprocket.

The method may further include removing the axial retaining ring from the circumferential groove before axially moving the locking sprocket. Still further, the method may include replacing the axial retaining ring into the circumferential groove after axially moving the locking sprocket. In various embodiments, positioning the second shaft includes aligning a plurality of first merlons of the first crenelated end rim with a plurality of second merlons of the second crenelated end rim.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
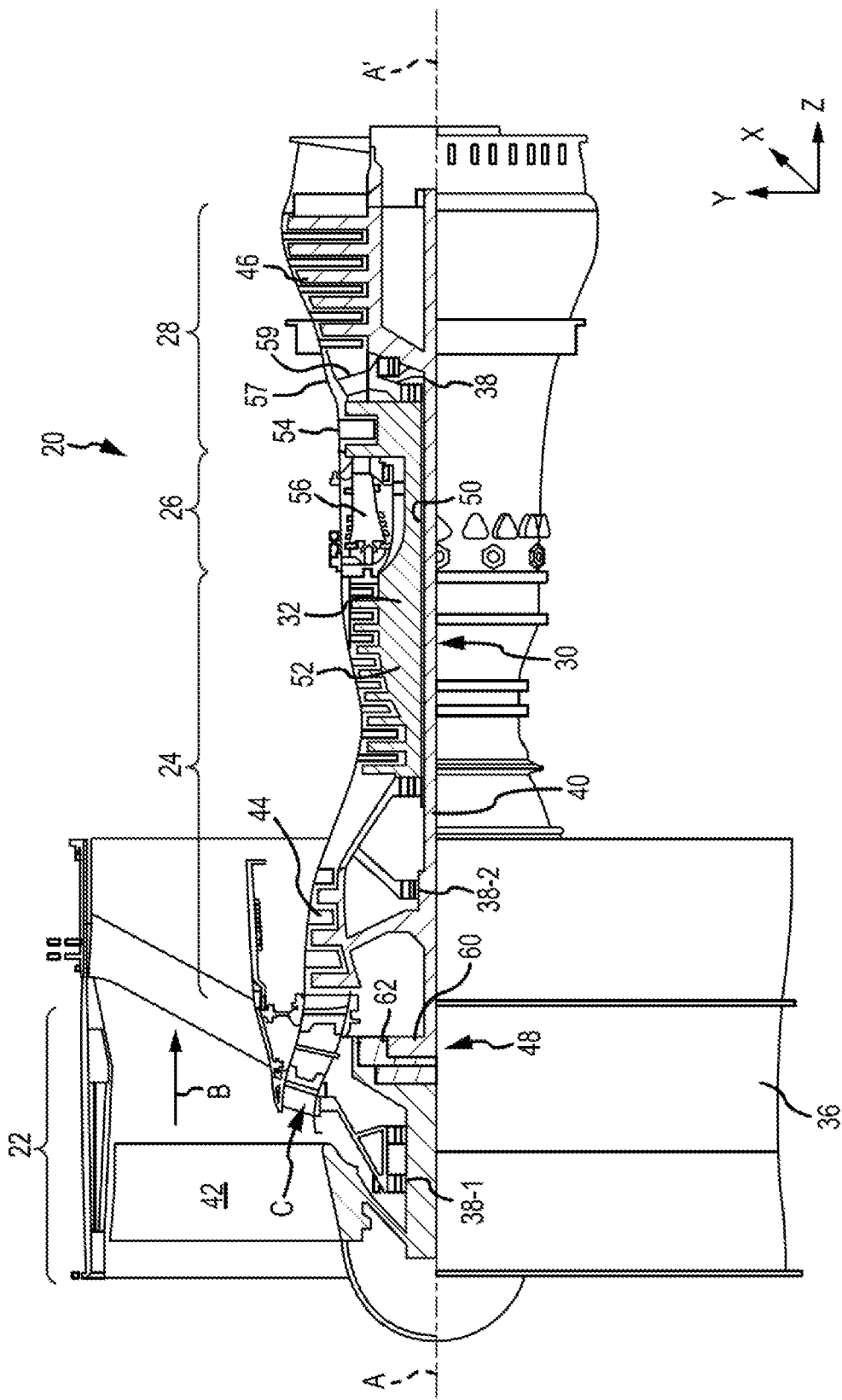
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is an anti-rotation assembly for preventing relative rotation between a first shaft and a second shaft. While numerous details are included herein pertaining to anti-rotatably coupling shafts and/or spools together of a gas turbine engine, the details of the conduit provided herein may be utilized in various applications.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions and the x direction on the provided xyz axis refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
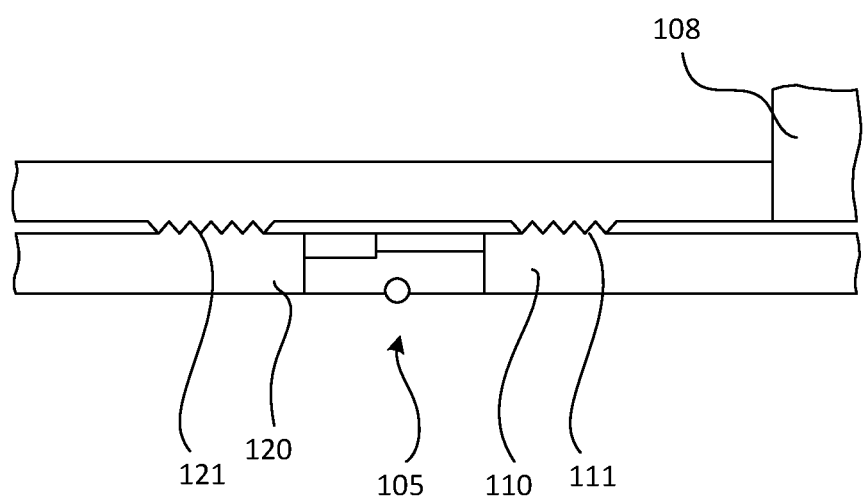
FIG. 2 is a cross-sectional view of two shafts coupled together in a gas turbine engine, in accordance with various embodiments.

In various embodiments, and with reference to FIG. 2, first shaft 110 and a second shaft 120 are coupled together at interface 105. The anti-rotation assembly provided herein, according to various embodiments, includes a locking sprocket generally disposed at the interface 105 and configured to engage end rims of the respective shafts 110, 120. The first shaft 110 may be a first stage turbine shaft and the second shaft 120 may be a second stage turbine shaft. In various embodiments, the first shaft 110 may be a turbine shaft while the second shaft 120 is a compressor shaft, according to various embodiments. In various embodiments, the first shaft 110 and the second shaft 120 may be operably coupled to components of the gas turbine engine via threads 111, 121. That is, the first and second shafts 110, 120 may have threads 111, 121 disposed on a radially outward surface for engaging with rotor disks 108 and/or other rotary components of the gas turbine engine. As mentioned above, while the first and second shafts 110, 120 may be shafts/spools of the gas turbine engine 20, the anti-rotation assembly provided herein may be implemented in other applications.

In various embodiments, and with reference to FIGS. 3A, 3B, 3C, and 3D, an anti-rotation assembly 100 is provided. Generally, the anti-rotation assembly 100 is a coupling configuration between two shafts that enables the two shafts to co-rotate while preventing relative rotation between the two shafts (i.e., the first shaft 110 and the second shaft 120 are anti-rotatably coupled together). In various embodiments, the anti-rotation assembly 100 includes the first shaft 110 having a first crenelated end rim 112, the second shaft 120 having a second crenelated end rim 122, and a locking sprocket 130 configured to engage both the first crenelated end rim 112 and the second crenelated end rim 122 in an assembled state (see FIG. 3D). That is, in the assembled state (FIG. 3D), the locking sprocket 130 is engaged with both the first crenelated end rim 112 and the second crenelated end rim 122 to anti-rotatably couple the first shaft 110 to the second shaft 120 and thereby prevent relative rotation between the two shafts 110, 120.

Figure 3A:
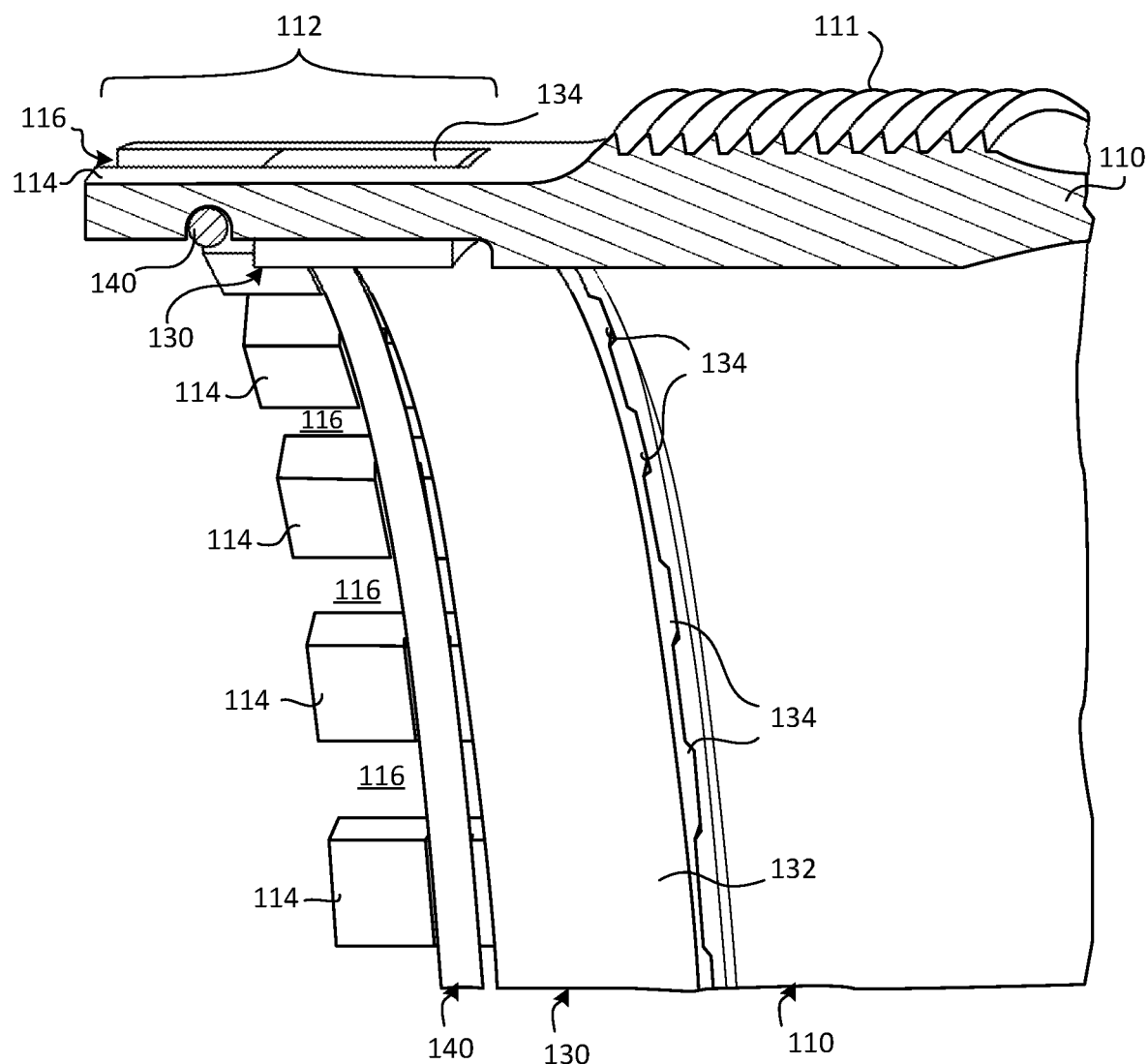
FIG. 3A is a perspective cross-sectional view of a first shaft of an anti-rotation assembly, in accordance with various embodiments.
Figure 3B:
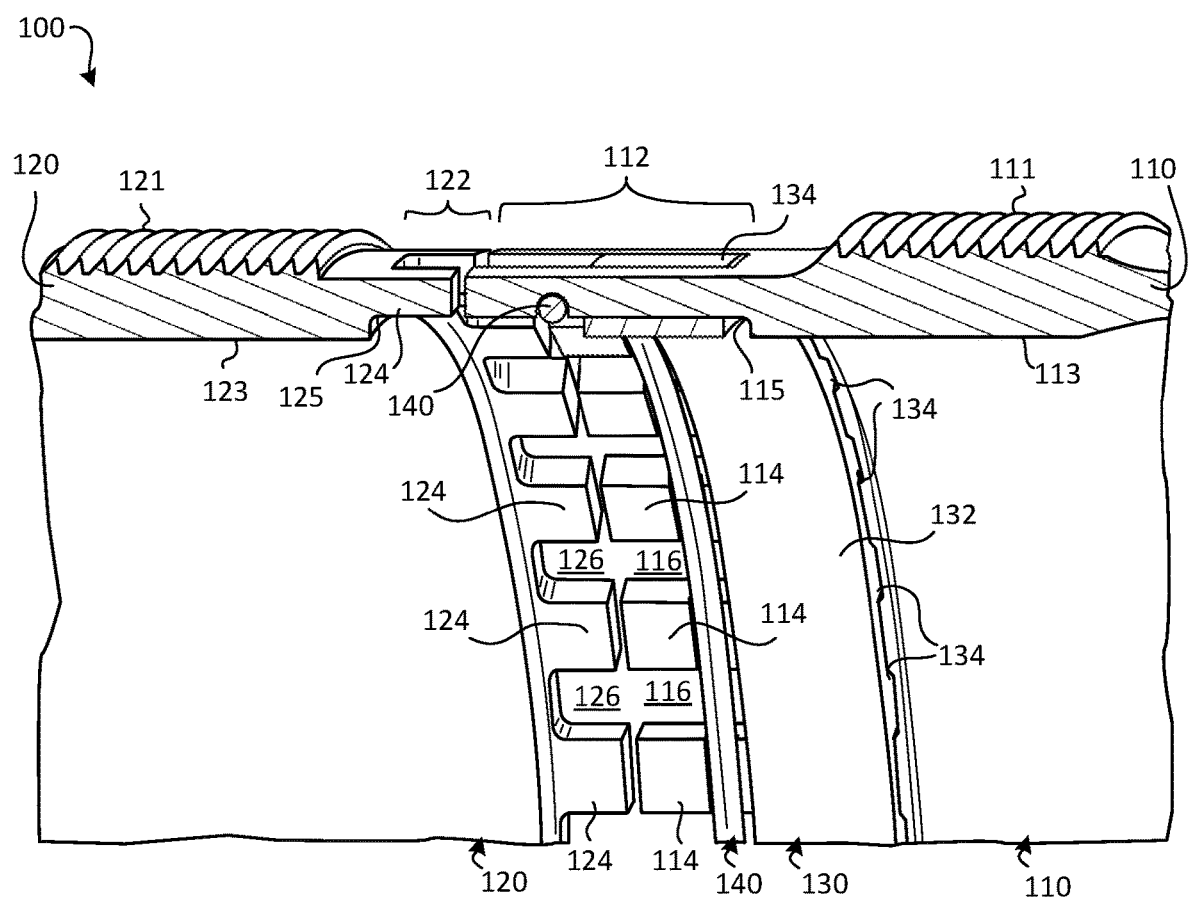
FIG. 3B is a perspective cross-sectional view of an anti-rotation assembly in an initial state, in accordance with various embodiments.
Figure 3C:
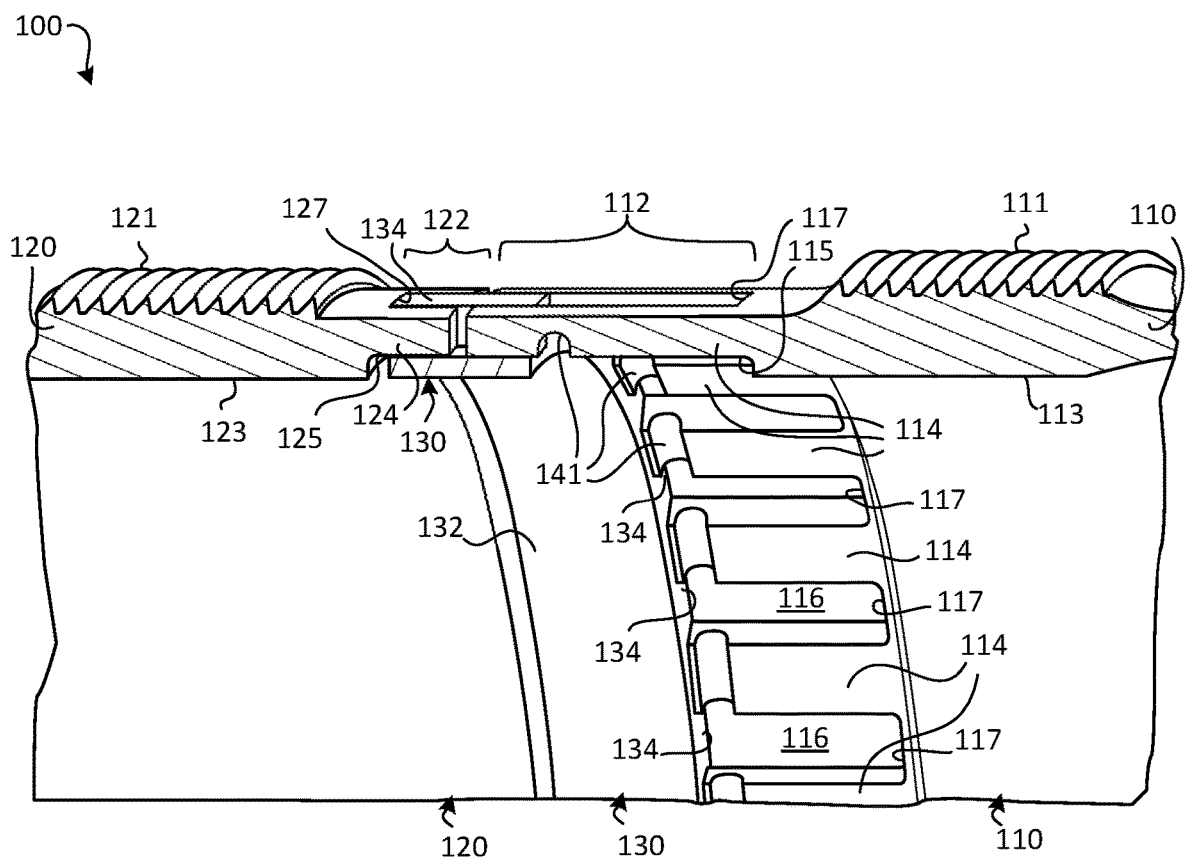
FIG. 3C is a perspective cross-sectional view of an anti-rotation assembly in an intermediate state, in accordance with various embodiments.
Figure 3D:
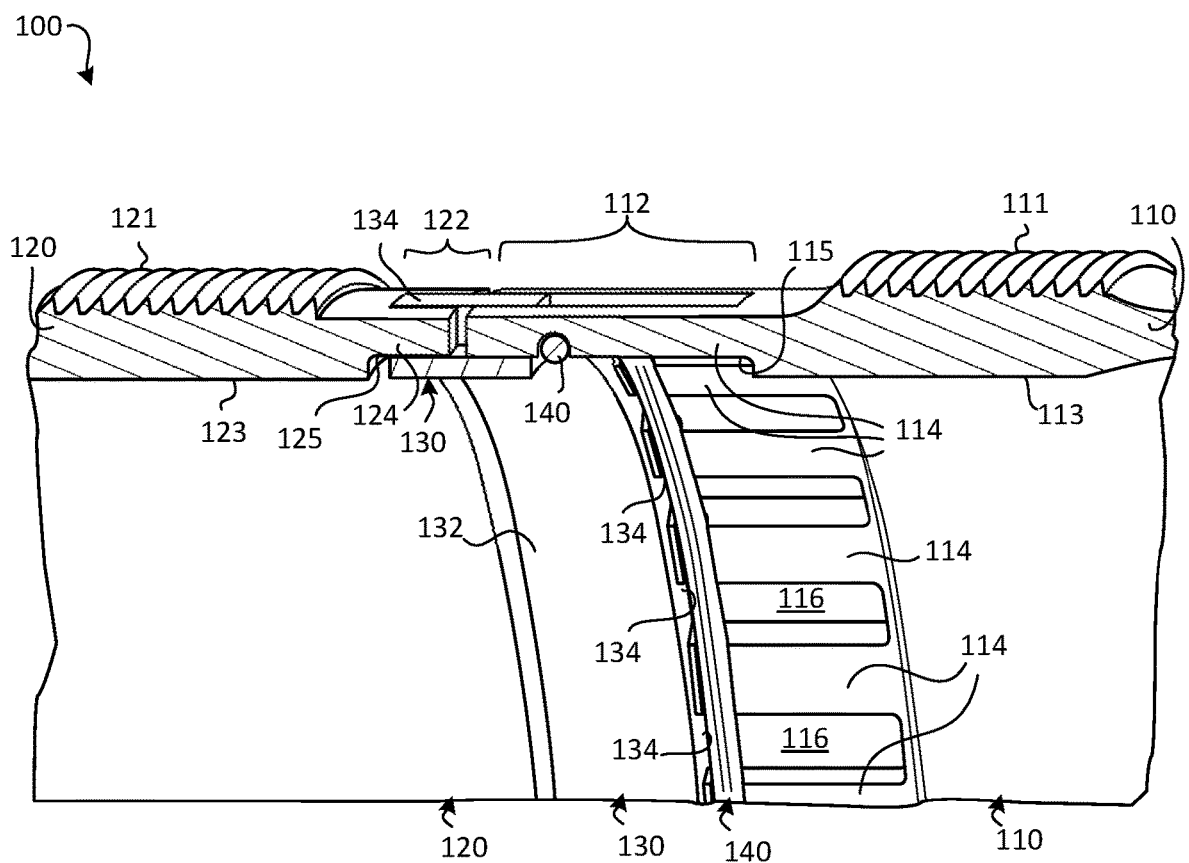
FIG. 3D is a perspective cross-sectional view of an anti-rotation assembly in an assembled state, in accordance with various embodiments.

The locking sprocket 130 includes a plurality of teeth 134 extending radially outward from a circumferential body 132, and the plurality of teeth 134 are configured to engage the crenelated end rims 112, 122 of the shafts 110, 120, according to various embodiments. In various embodiments, the anti-rotation assembly 100 further includes an axial retaining ring 140 configured to axially retain the locking sprocket. These components are described in greater detail below. In various embodiments, FIG. 3A shows the first shaft 110 with the locking sprocket 130 exclusively on the first shaft 110 in a pre-assembled state, FIG. 3B shows the anti-rotation assembly 100 in an initial state with the locking sprocket 130 still engaged only on the first shaft 110, FIG. 3C shows the anti-rotation assembly 100 in an intermediate state, with the locking sprocket 130 axially repositioned to engage both the first shaft 110 and the second shaft 120, and FIG. 3D shows the anti-rotation assembly 100 in an assembled state, with the locking sprocket 130 axially retained by an axial retaining ring 140. Additional details pertaining to each of these states of the anti-rotation assembly 100 are included below.

In various embodiments, the first crenelated end rim 112 of the first shaft 110 includes a plurality of first merlons 114 and the first crenelated end rim 112 defines a plurality of first crenels 116 interposed between the plurality of first merlons 114. As used herein, the term "merlon" refers to a protrusion extending axially outward from an end of a shaft and the term "crenel" refers to gaps or spaces defined between adjacent merlons. In various embodiments, the second crenelated end rim 122 of the second shaft 120 includes a plurality of second merlons 124 and the second crenelated end rim 122 defines a plurality of second crenels 126 interposed between the plurality of second merlons 124.

In the pre-assembled state and the initial state (e.g., FIGS. 3A and 3B, respectively), the plurality of teeth 134 of the locking sprocket 130 extend into the plurality of first crenels 116 and the axial retaining ring 140 is disposed to axially retain the locking sprocket 130 in engagement with the first crenelated end rim 112, according to various embodiments. In the intermediate state and the assembled state (e.g., FIGS. 3C and 3D, respectively), the locking sprocket 130 engages both the first crenelated end rim 112 and the second crenelated end rim 122 by the plurality of teeth 134 being disposed in the plurality of first crenels 116 and the plurality of second crenels 126. In various embodiments, and as described in greater detail below with reference to FIG. 4, the plurality of first merlons 114 are aligned with the plurality of second merlons 124 and, correspondingly, the plurality of first crenels 116 are aligned with the plurality of second crenels 126, thus enabling the locking sprocket 130 to slide axially from being exclusively engaged with a proximal portion of the first crenelated end rim 112 (FIGS. 3A and 3B) to being engaged with a distal portion of the first crenelated end rim 112 and the second crenelated end rim 122 (FIGS. 3C and 3D). Accordingly, the first crenelated end rim 112 is axially longer than the second crenelated end rim 122, according to various embodiments. In various embodiments, the first crenelated end rim 112 is three (3) times longer than the second crenelated end rim 122. In various embodiments, the first crenelated end rim 112 is between three (3) and four (4) times longer than the second crenelated end rim 122.

In various embodiments, the body 132 of the locking sprocket 130 is disposed radially inward of the first crenelated end rim 112 and disposed radially inward of the second crenelated end rim 122. In various embodiments, an inner radius of the body 132 of the locking sprocket 130 is substantially the same as an inner radius of the first and second shafts 110, 120. Accordingly, and with reference to FIGS. 3B, 3C, and 3D, a radially inward surface 113 of the first shaft 110 and a radially inward surface 123 of the second shaft 120 comprise respective radially outward indentations 115, 125 at least along the first crenelated end rim 112 and the second crenelated end rim 122 to provide radial clearance for the body 132 of the locking sprocket 130, thus preventing the body 132 of the locking sprocket 130 from protruding radially inward into the central cavity of the first and second shafts 110, 120.

In various embodiments, and with momentary reference to FIG. 3C, the plurality of first merlons 114 collectively define an intermittent circumferential groove 141 that is configured to receive the axial retaining ring 140. The axial retaining ring 140 may be positioned to extend through the intermittent circumferential groove 141 defined by the plurality of first merlons 114, thereby providing an axial stop for the locking sprocket 130. In various embodiments, and with continued momentary reference to FIG. 3C, the circumferential groove 141 is disposed at an axial midpoint between first closed ends 117 of the plurality of first crenels 116 and second closed ends 127 of the plurality of second crenels 126. In such a configuration, the axial retaining ring 140 is able to provide axial retention to the locking sprocket 130 when the anti-rotation assembly 100 is in its pre-assembled or initial state (i.e., when the locking sprocket 130 is exclusively engaged with the first crenelated end rim 112; FIGS. 3A and 3B) and when the anti-rotation assembly 100 is in its intermediate or assembled state (i.e., when the locking sprocket 130 is engaged with both the first crenelated end rim 112 and the second crenelated end rim 122; FIGS. 3C and 3D).

Figure 4:
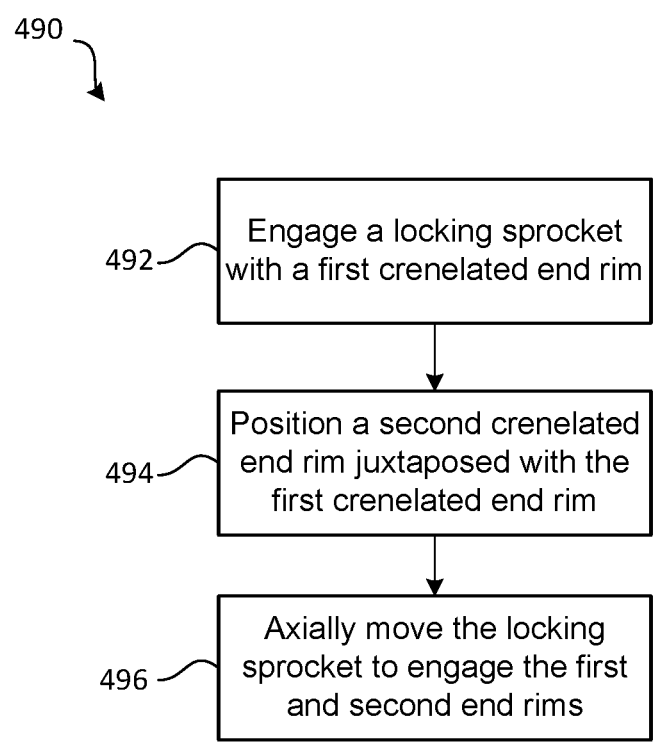
FIG. 4 is a schematic flow chart diagram of a method of assembling a gas turbine engine, in accordance with various embodiments.

In various embodiments, and with reference to FIG. 4, a method 490 of assembling a gas turbine engine is provided. The method 490 includes, according to various embodiments, engaging the locking sprocket with the first crenelated end rim 112 at step 492. The method 490 may further include positioning the second crenelated end rim 122 juxtaposed with the first crenelated end rim 112 at step 494. Still further, the method 490 may include axially moving the locking sprocket 130 to engage both the first and second end rims at step 496. That is, the locking sprocket 130 may slide axially to engage both the first crenelated end rim 112 of the first shaft 110 and the second crenelated end rim 122 of the second shaft 120.

In various embodiments, step 492 includes engaging the axial retaining ring 140 in the circumferential groove 141 that is defined in the radially inward surface of the plurality of first merlons 114 of the first crenelated end rim 112 to axially retain the locking sprocket 130 in the pre-assembled or initial state of the anti-rotation assembly 100. The method 490 further includes removing the axial retaining ring 140 from the circumferential groove 141 before step 496. Still further, the method 490 may include replacing the axial retaining ring 140 into the circumferential groove after step 496. In various embodiments, step 494 may include aligning the plurality of first merlons 114 of the first crenelated end rim 112 with the plurality of second merlons 124 of the second crenelated end rim 122.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-rotation assembly comprising:
a first shaft comprising a first crenelated end rim defining a plurality of first crenels;
a second shaft comprising a second crenelated end rim defining a plurality of second crenels;
a locking sprocket comprising a body and a plurality of teeth extending from the body, wherein the body of the locking sprocket locking sprocket is disposed radially inward of the first crenelated end rim and the second crenelated end rim, wherein the locking sprocket is configured to engage the first crenelated end rim and the second crenelated end rim to anti-rotatably couple the first shaft to the second shaft, wherein the plurality of teeth are configured to extend into the plurality of first crenels and the plurality of second crenels to prevent relative rotation between the first shaft and the second shaft; and
an axial retaining ring configured to axially retain the locking sprocket.

2. The anti-rotation assembly of claim 1, wherein an inner radius of the body of the locking sprocket is the same as an inner radius of the first shaft and the second shaft.

3. The anti-rotation assembly of claim 1, wherein:
the plurality of first crenels are defined between a plurality of first merlons of the first crenelated end rim;
the plurality of second crenels are defined between a plurality of second merlons of the second crenelated end rim;
the plurality of first merlons are aligned with the plurality of second merlons; and
the plurality of first crenels are aligned with the plurality of second crenels.

4. The anti-rotation assembly of claim 3, wherein the plurality of first merlons collectively define a circumferential groove configured to receive the axial retaining ring.

5. The anti-rotation assembly of claim 4, wherein the first crenelated end rim is axially longer than the second crenelated end rim.

6. The anti-rotation assembly of claim 4, wherein the circumferential groove is disposed at an axial midpoint between first closed ends of the plurality of first crenels of the first crenelated end rim and second closed ends of the plurality of second crenels of the second crenelated end rim.

7. The anti-rotation assembly of claim 1, wherein the first shaft comprises first threads disposed on a first radially outward surface of the first shaft and the second shaft comprises second threads disposed on a second radially outward surface of the second shaft.

8. The anti-rotation assembly of claim 1, wherein the first shaft and second shaft are shafts of a gas turbine engine.

9. The anti-rotation assembly of claim 8, wherein the first shaft is a first stage turbine shaft and the second shaft is a second stage turbine shaft.

10. The anti-rotation assembly of claim 8, wherein the first shaft is a turbine shaft and the second shaft is a compressor shaft.

11. A method of assembling a gas turbine engine, the method comprising:
engaging a locking sprocket on a first crenelated end rim of a first shaft;
positioning a second shaft so that a second crenelated end rim of the second shaft is juxtaposed with the first crenelated end rim;
axially moving the locking sprocket to engage the first crenelated end rim and the second crenelated end rim; and
engaging an axial retaining ring in a circumferential groove defined in the first crenelated end rim to retain the locking sprocket in place;
wherein:
the first crenelated end rim defines a plurality of first crenels;
the second crenelated end rim defines a plurality of second crenels;
the locking sprocket comprises a body and a plurality of teeth extending from the body;
the body of the locking sprocket is disposed radially inward of the first crenelated end rim and the second crenelated end rim; and
axially moving the locking sprocket to engage the first crenelated end rim and the second crenelated end rim comprises inserting the plurality of teeth to extend into the plurality of first crenels and the plurality of second crenels to prevent relative rotation between the first shaft and the second shaft.

12. The method of claim 11, wherein engaging the locking sprocket on the first crenelated end rim of the first shaft comprises engaging the axial retaining ring in the circumferential groove.

13. The method of claim 12, further comprising removing the axial retaining ring from the circumferential groove before axially moving the locking sprocket.

14. The method of claim 13, further comprising replacing the axial retaining ring into the circumferential groove after axially moving the locking sprocket.

15. The method of claim 11, wherein positioning the second shaft comprises aligning a plurality of first merlons of the first crenelated end rim with a plurality of second merlons of the second crenelated end rim.

16. An anti-rotation assembly comprising:
a first shaft comprising a first crenelated end rim defining a plurality of first crenels, wherein the plurality of first crenels are defined between a plurality of first merlons of the first crenelated end rim;
a second shaft comprising a second crenelated end rim defining a plurality of second crenels, wherein the plurality of second crenels are defined between a plurality of second merlons of the second crenelated end rim;
a locking sprocket comprising a plurality of teeth, wherein the locking sprocket is configured to engage the first crenelated end rim and the second crenelated end rim to anti-rotatably couple the first shaft to the second shaft, wherein the plurality of teeth are configured to extend into the plurality of first crenels and the plurality of second crenels to prevent relative rotation between the first shaft and the second shaft; and
an axial retaining ring configured to axially retain the locking sprocket;
wherein
the plurality of first merlons are aligned with the plurality of second merlons and the plurality of first crenels are aligned with the plurality of second crenels;
the plurality of first merlons collectively define a circumferential groove configured to receive the axial retaining ring; and
the circumferential groove is disposed at an axial midpoint between first closed ends of the plurality of first crenels of the first crenelated end rim and second closed ends of the plurality of second crenels of the second crenelated end rim.

17. The an anti-rotation assembly of claim 16, wherein a body of the locking sprocket, from which the plurality of teeth extends, is disposed radially inward of the first crenelated end rim and the second crenelated end rim.

18. The anti-rotation assembly of claim 17, wherein an inner radius of the body of the locking sprocket is the same as an inner radius of the first shaft and the second shaft.

19. The anti-rotation assembly of claim 16, wherein the first crenelated end rim is axially longer than the second crenelated end rim.

* * * * *